United States Patent [19]

Strem et al.

[11] 4,191,153
[45] Mar. 4, 1980

[54] ASSEMBLY AND METHOD OF VAPORIZING LIQUID GASOLINE FUEL AND SYSTEM

[75] Inventors: Robert C. Strem; R. C. Strem, both of Newcastle; John H. Eberle, Colfax, all of Calif.

[73] Assignee: Omnewtronics, Inc., Carson City, Nev.

[21] Appl. No.: 856,494

[22] Filed: Dec. 1, 1977

Related U.S. Application Data

[63] Continuation-in-part of Ser. No. 843,799, Oct. 20, 1977.

[51] Int. Cl.² ............................................. F02M 17/22
[52] U.S. Cl. .................................. 123/133; 123/134; 123/135; 261/106
[58] Field of Search ............... 123/133, 134, 135, 131; 261/106, 107, 103, 104, 100

[56] References Cited

U.S. PATENT DOCUMENTS

| | | | |
|---|---|---|---|
| 320,460 | 6/1885 | Copeland | 123/135 |
| 529,625 | 11/1894 | Lowe | 261/106 |
| 588,381 | 8/1897 | Best | 123/135 |
| 610,159 | 8/1898 | Speer | 123/134 |
| 633,319 | 9/1899 | Inman | 123/135 |
| 654,504 | 7/1900 | Woods | 123/135 |
| 2,057,937 | 10/1936 | Colla | 123/133 |
| 2,863,808 | 12/1958 | Markels | 261/106 |
| 3,743,258 | 7/1973 | Florentine | 123/135 |
| 3,999,526 | 12/1976 | Asfar | 123/133 |
| 4,031,874 | 6/1977 | Alwine | 123/133 |

Primary Examiner—Samuel Scott
Assistant Examiner—Daniel J. O'Connor
Attorney, Agent, or Firm—Flehr, Hohbach, Test, Albritton & Herbert

[57] ABSTRACT

Both a system for and method of feeding gasoline fuel into a gasoline burning internal combustion engine are disclosed herein. In accordance with this system and method, gasoline fuel in a liquid state is first supplied to a vaporization chamber where it is vaporized, preferably without the use of externally applied heat. The gasoline in this state is then directed to the engine. In a preferred embodiment, the amount of vaporized gasoline directed into the engine is automatically varied, depending upon the power developed by the engine. Both an assembly for and method of vaporizing the gasoline are also disclosed herein.

1 Claim, 11 Drawing Figures

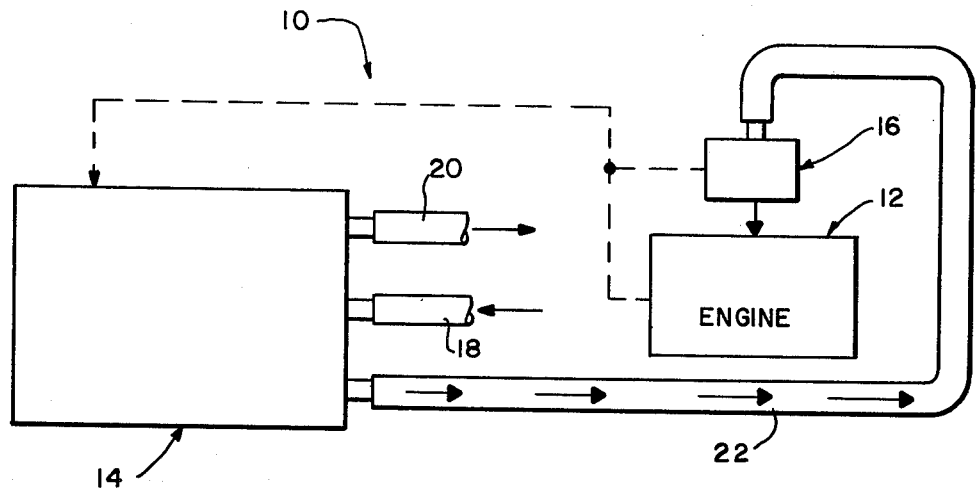
FIG.—1
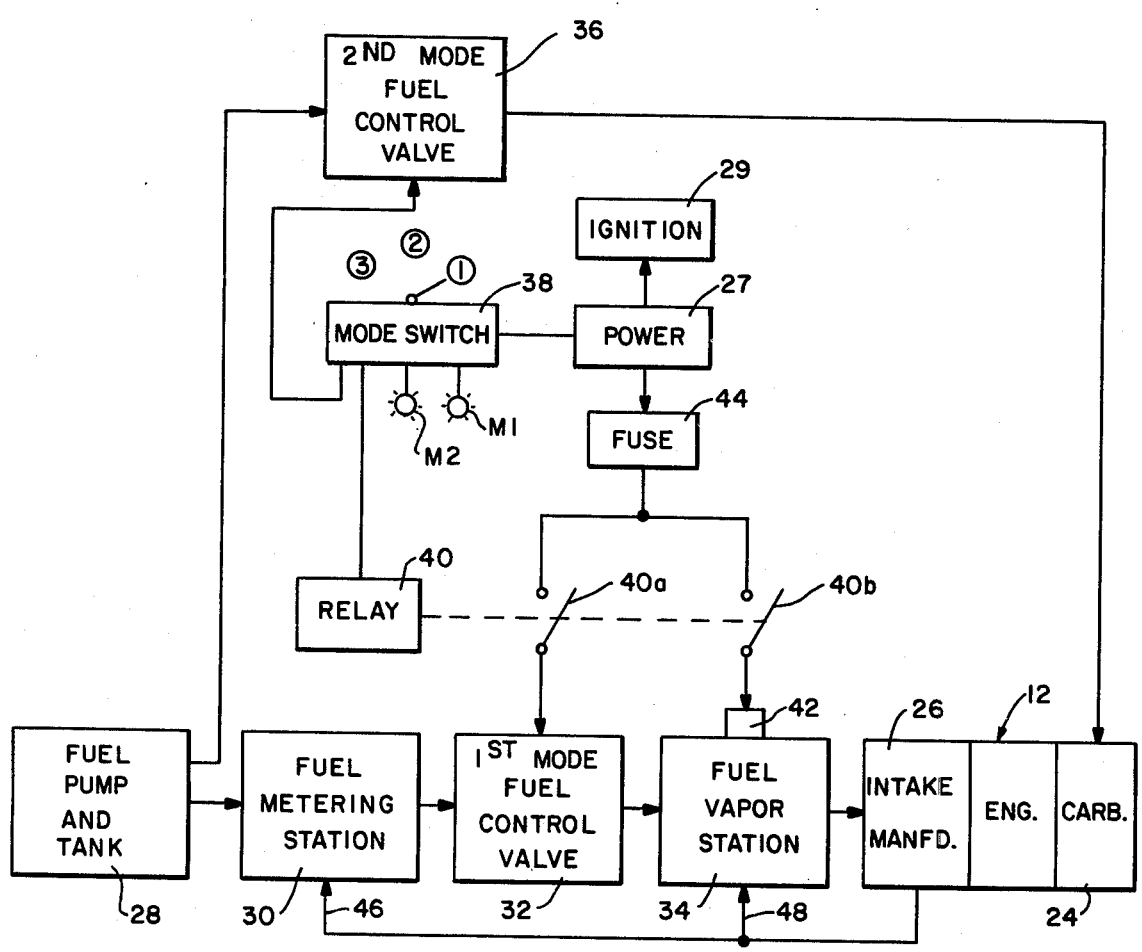
FIG.—2

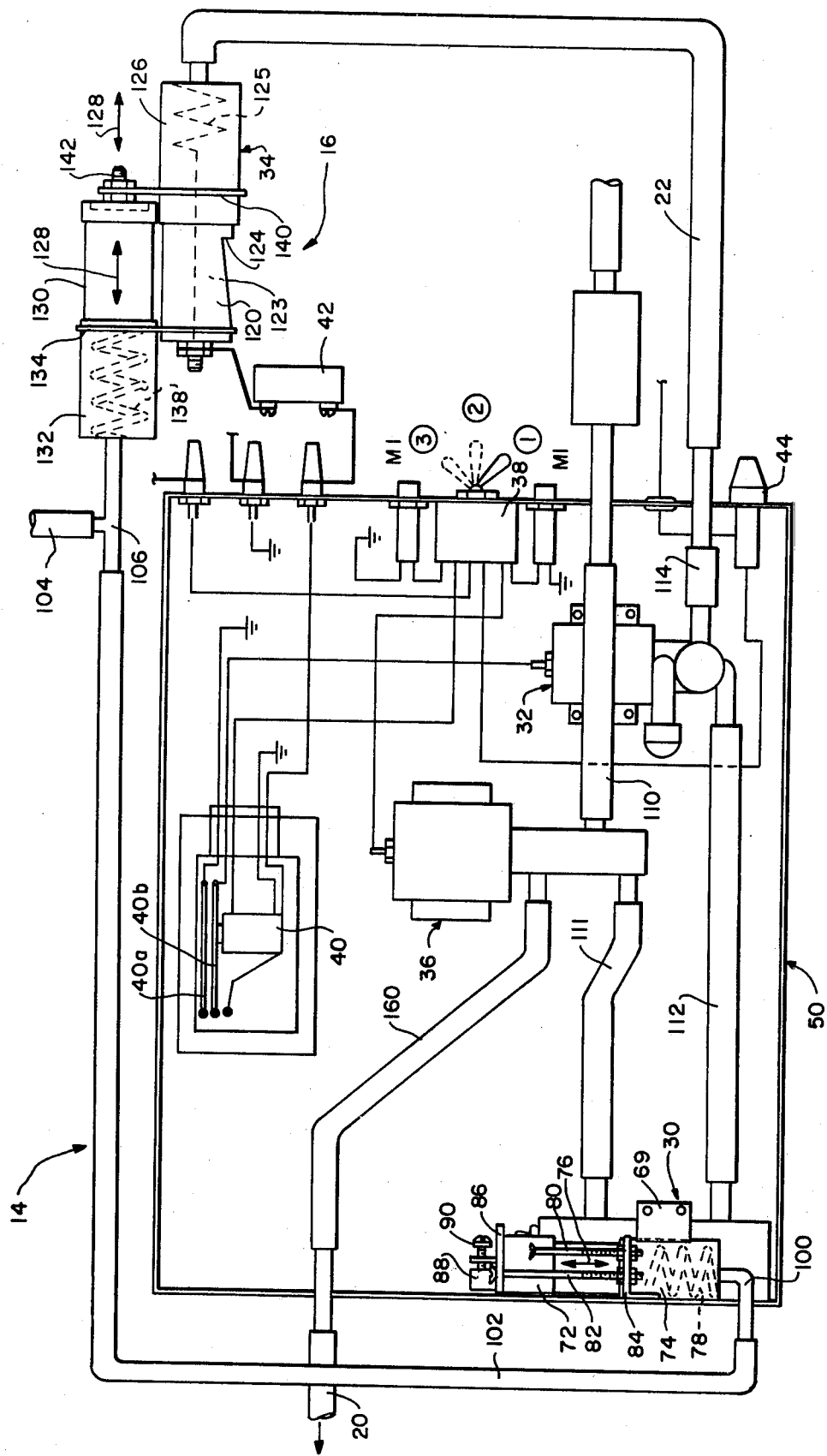
FIG.—3

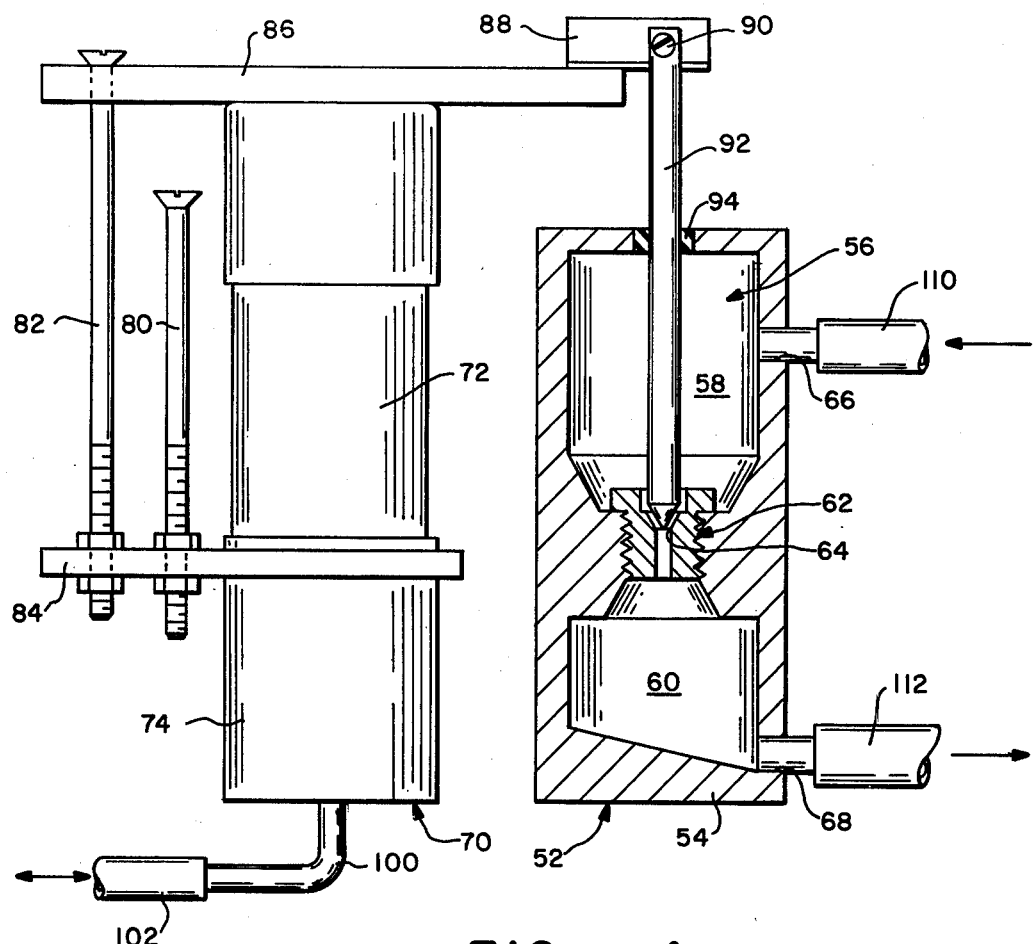
FIG.—4
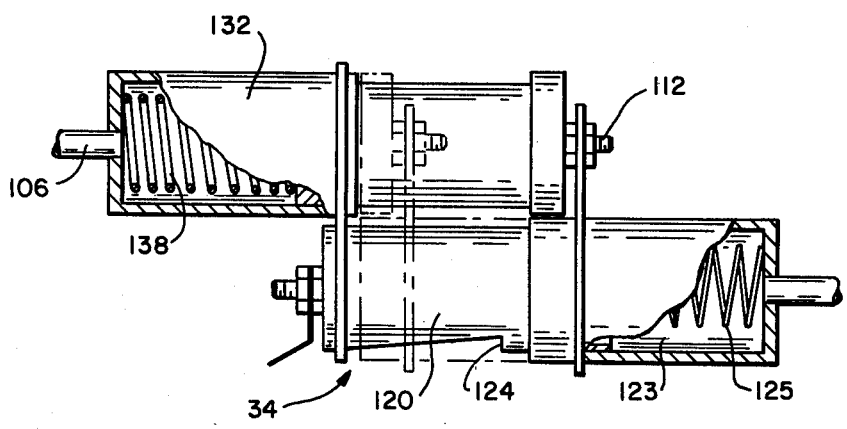
FIG.—5

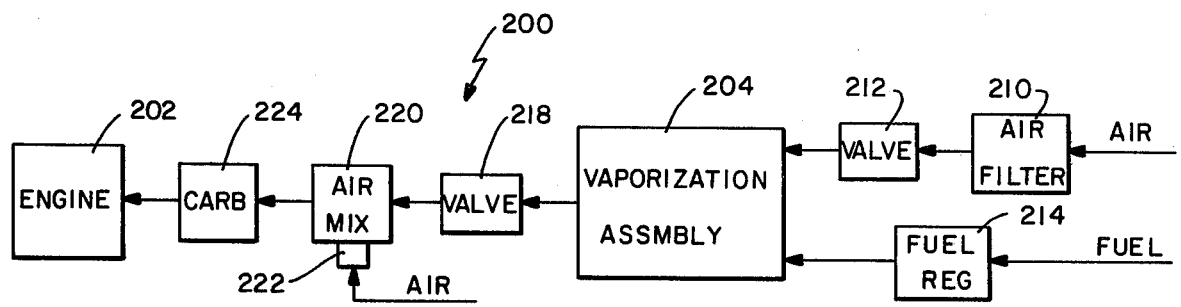
FIG.—6
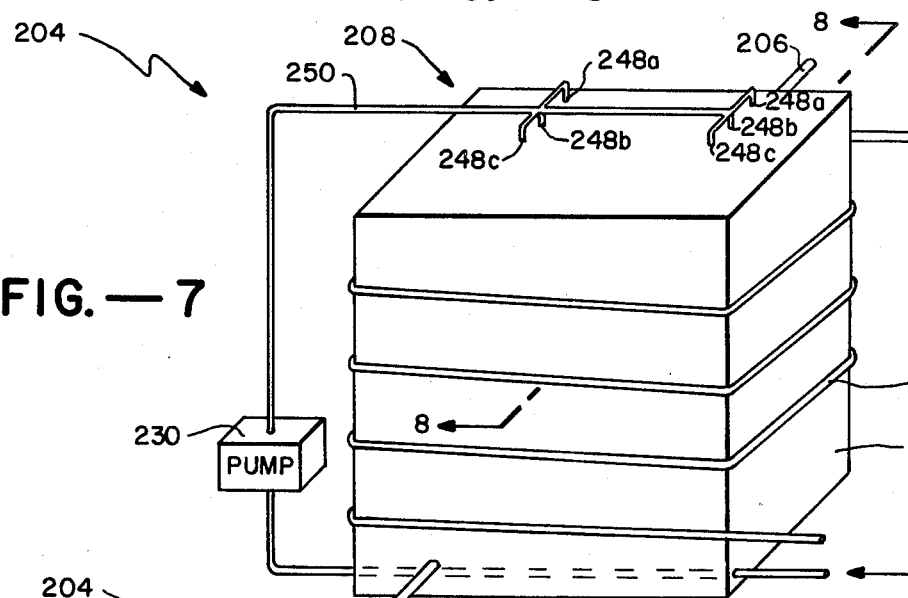
FIG.—7
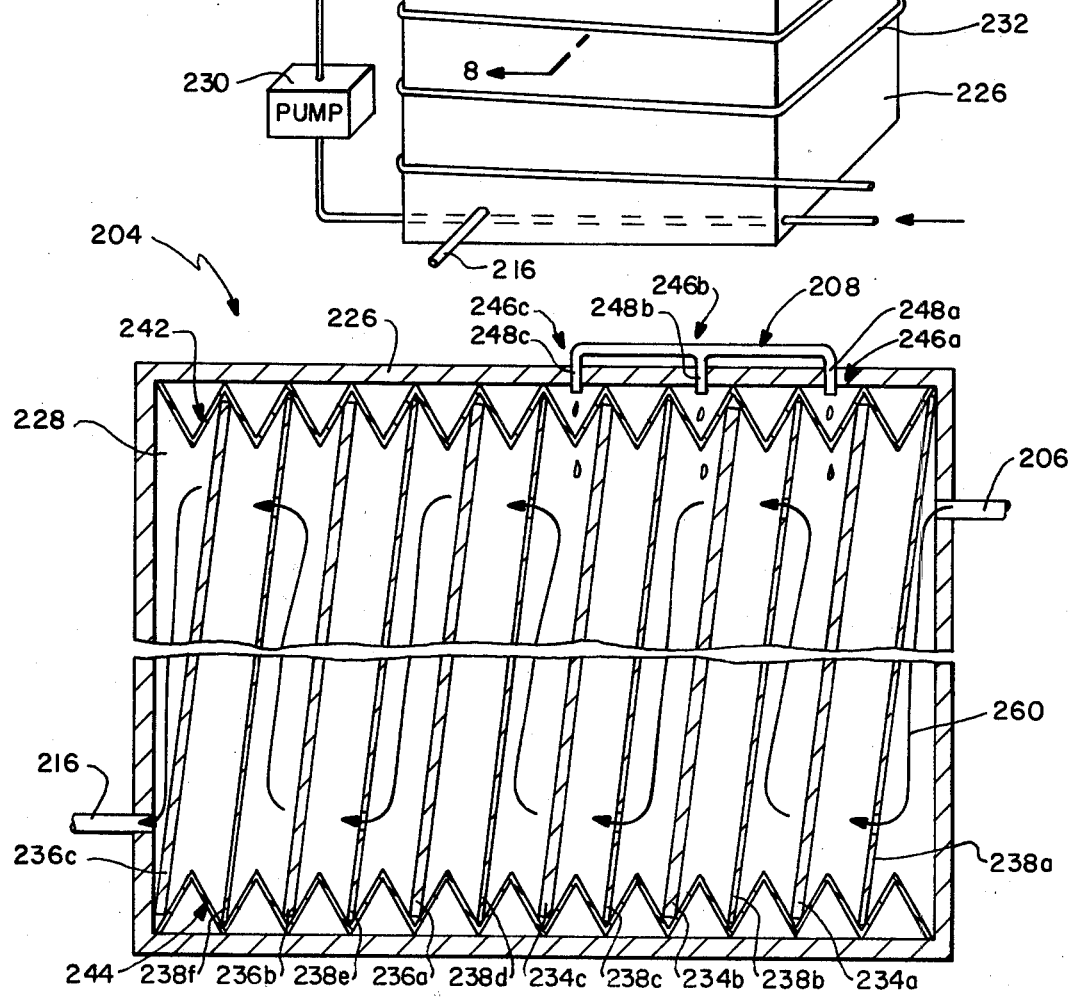
FIG.—8

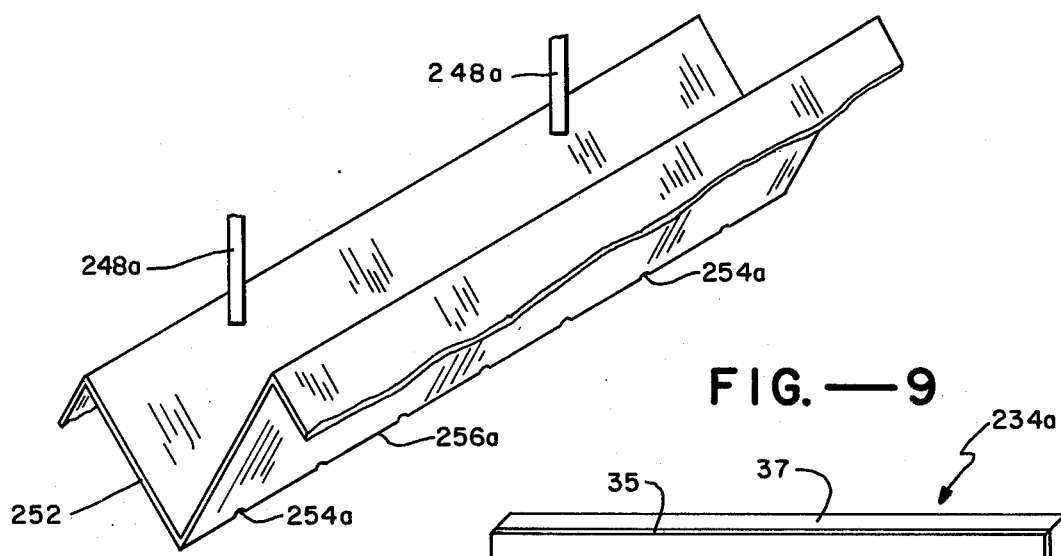
FIG.—9
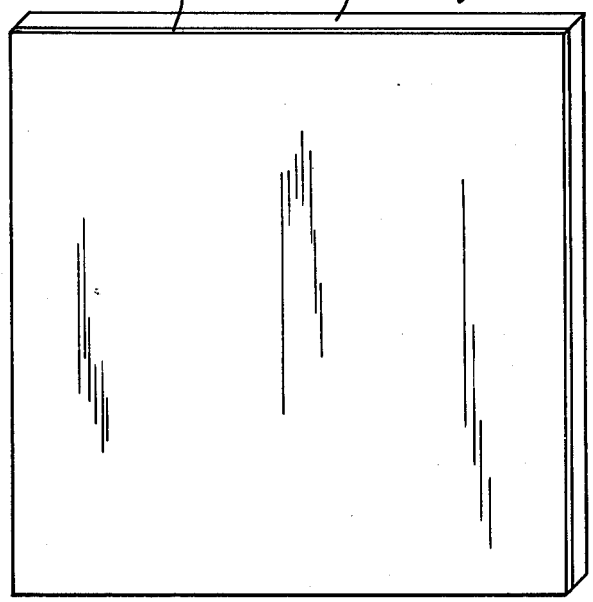
FIG.—10
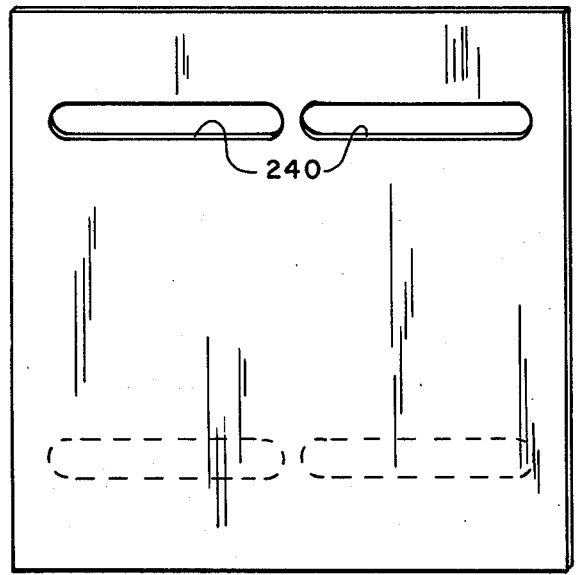
FIG.—11

ASSEMBLY AND METHOD OF VAPORIZING LIQUID GASOLINE FUEL AND SYSTEM

REFERENCE TO PARENT APPLICATION

This application is a Continuation-in-Part of co-pending Parent Application Ser. No. 843,799 filed Oct. 20, 1977, entitled SYSTEM AND METHOD OF FEEDING GASOLINE FUEL INTO AN INTERNAL COMBUSTION ENGINE.

BACKGROUND OF THE INVENTION

The present invention relates generally to gasoline burning internal combustion engines and more particularly to a system for and method of feeding gasoline fuel into an engine of this type.

Today, a typical gasoline burning internal combustion engine utilizing standard fuel feed apparatus receives liquid gasoline. In this standard apparatus, liquid gasoline is pumped into and through the engine's carburetor where it is mixed with air (atomized) and then ultimately through the intake manifold (through appropriate butterfly valves) and into the engine, the gasoline remaining liquid (theoretically atomized) before reaching this point. This particular method has several disadvantages. First, as the gasoline passes through the carburetor the venturis within atomize the fuel, but only to a limited extent. As a result of the partial atomization, the overall efficiency of the engine is reduced. Second, even if total atomization is attained, it has been found that this is never the less a relatively inefficient way to combust the fuel.

There is still another disadvantage resulting from the utilization of conventional feed apparatus for gasoline burning internal combustion engines. This relates more to the manner in which the gasoline is fed into the engine rather than its particular state. More specifically, in conventional feed apparatus, the amount of gasoline fed into the engine is dependent solely on what takes place at the fuel pump and associated throttle which is controlled directly by the operator. Accordingly, at a given throttle position, for example half-throttle (half power), the same amount of gasoline will be fed to the engine, regardless of the needed power to be developed by the engine to maintain or exceed its RPM rating at that throttle position. In the event that the engine requires more power and hence more fuel, for example in the case of a vehicle powered by the engine, when the vehicle starts up a hill, this fuel will not be provided unless the operator manually feeds more gasoline into the engine, that is, increased the throttle. In a similar fashion, when the vehicle starts down a hill less power and hence less fuel is required and yet the amount of fuel fed to the engine will not be reduced unless the operator manually does so by lowering the throttle level. It has been found that this required manual reponse to changes in power and fuel requirement by the engine also reduces the efficiency of gasoline usage.

As will be seen hereinafter, the present invention provides both a system for and method of feeding gasoline fuel into a gasoline burning internal combustion engine in a more efficient manner than heretofore attainable by conventional feed apparatus. As will also be seen, this is accomplished by vaporizing the gasoline outside of the engine, prior to combustion, and, in a preferred embodiment, this vaporized gasoline is automatically delivered to the engine, in varying amounts depending upon the power developed by the engine, even through the throttle may remain in a fixed position. Also, in accordance with this preferred embodiment, the gasoline is vaporized in a specific way without the utilization of directly applied heat.

OBJECTS AND SUMMARY OF THE INVENTION

One object of the present invention is to provide an efficient and yet uncomplicated and economical system for feeding gasoline fuel into a gasoline burning internal combustion engine.

Another object of the present invention is to provide a system which improves upon gasoline usage in a gasoline burning internal combustion engine.

Still another object of the present invention is to provide a system for feeding gasoline fuel into a gasoline burning internal combustion engine, which system does not require a carburetor, but rather feeds directly into the intake manifold of the engine, thereby eliminating the various disadvantages resulting from the utilization of a carburetor.

Yet another object of the present invention is to provide a system of the last-mentioned type which can be readily incorporated into an existing engine including a carburetor.

A further object of the present invention is to provide a method of feeding gasoline fuel into a gasoline burning internal combustion engine, which method includes the various objectives set forth above.

These objects, as well as other objects and features, are achieved by the particular system and method of the present invention as will become apparent hereinafter. In this regard, for purposes of description, both the present system and method will be described in relation to an internal combustion engine used for powering a vehicle, for example an automobile. However, it is to be understood that the present invention is equally applicable where the engine is provided for powering or driving other apparatus. Moreover, fuels other than gasoline may be utilized by the present invention and for purposes of the present invention would be equivalent so long as they function in an internal combustion engine in the same manner as gasoline. Regarding this latter point, it should be clear that, for example, diesel fuel would not be such a fuel.

In accordance with the present invention, gasoline fuel is supplied in a liquid state from a supply tank to a collection chamber where it is vaporized, preferably without the utilization of directly applied heat, and then directed into the engine in this latter state. It has been found that vaporizing the gasoline results in more efficient combustion than when the gasoline to be combusted is partially atomized or even completely atomized. Moreover, the carburetor which is used in a conventional gasoline burning internal combustion engine can be eliminated, thus eliminating atomization of fuel and partial atomization. Hence, the system and method of the present invention provides more efficient utilization of fuel than does the conventional gasoline feed systems utilized heretofore.

In a preferred embodiment of the present invention, as will be discussed in more detail hereinafter, the vaporized gasoline is automatically directed to the engine in varying amounts depending upon the power developed by the engine. More specifically, once the operator selects the desired throttle position to attain a certain RPM operating condition, the necessary amount of fuel required to maintain this condition is continuously and automatically fed into the engine without requiring the operator to continuously change the throttle position. This is true even though the vehicle powered by the engine may be required to travel uphill from a level course (requiring more fuel) or it takes downhill course (requiring less fuel).

As stated above, the gasoline fuel is vaporized preferably without the direct application of heat. As will be seen hereinafter, this is accomplished, in a preferred embodiment, by providing a housing including an internal chamber and a porous liquid gasoline supporting member within the chamber. A predetermined amount of liquid gasoline is applied onto the supporting member and vaporized thereon. At the same time, a stream of air is directed through the member, whereby the vaporized gasoline is entrained by and carried with the stream of air, ultimately for use in the internal combustion engine.

BRIEF DESCRIPTION OF THE DRAWINGS

FIG. 1 is a block diagram of a system which has been designed in accordance with one embodiment of the present invention and which is provided for feeding gasoline fuel into a gasoline burning internal combustion engine.

FIG. 2 is a more detailed block diagram of the system illustrated in FIG. 1.

FIG. 3 is a detailed schematic illustration of the system illustrated in FIGS. 1 and 2.

FIG. 4 is an enlarged schematic illustration of one of the arrangements comprising part of the system illustrated in FIGS. 1 to 3.

FIG. 5 is an enlarged schematic illustration of another arrangement comprising part of the system illustrated in FIGS. 1 to 3. been designed in accordance with another embodiment of the present invention and which is provided for feeding gasoline fuel into a gasoline burning internal combustion engine.

FIG. 6 shows in block diagram form an alternative system designed to convert liquid gasoline to vaporized fuel ultimately for use in an engine.

FIG. 7 is a perspective view of an assembly which is provided for converting liquid gasoline into a vapor state for use in the internal combustion engine illustrated in FIG. 6 and which is constructed in accordance with the present invention.

FIG. 8 is a sectional view taken generally along the line 8—8 in FIG. 7.

FIG. 9 is a perspective view of one component, partially broken away, utilized in the assembly illustrated in FIGS. 7 and 8.

FIG. 10 is a perspective view of another component utilized in the assembly illustrated in FIGS. 7 and 8.

FIG. 11 is a vertical plan view of still another component utilized in the assembly illustrated in FIGS. 7 and 8.

DETAILED DESCRIPTION

Turning now to the drawings, wherein like components are designated by like reference numerals throughout the various figures, attention is first directed to Figure. This figure illustrates a system 10 which is designed in accordance with the present invention and which is provided for feeding gasoline fuel into a gasoline burning internal combustion engine, generally designated at 12. The engine itself may be of any conventional type which burns gasoline fuel and would include all of the required components to make it function properly including internal components, for example an intake manifold, and external but cooperating components such as a carburetor, a fuel pump and cooperating throttle and the like. In fact, as will be discussed hereinafter, in accordance with one embodiment of the present invention, the internal combustion engine is of a conventional type which includes an intake manifold and which, when operating, draws a vacuum through the manifold. The level of this vacuum depends upon the power developed by the engine, that is, it is inversely proportional to the power developed by the engine. Hence, during an idle condition, (low power), the level of vacuum is high, for example 21 inches of mercury. At half power, the vacuum is at a lower level, for example 7 inches of mercury, and at full power the vacuum is at a minimum level, for example no vacuum at all.

For purposes of description, system 10 may be separated into two subsystems, one of which is indicated at 14 and the other which is indicated at 16. As will be discussed in more detail hereinafter, subsystem 14 receives fuel from the fuel pump, specifically from the carburetor when one is provided via input hose 18. This fuel is either applied directly back into the carburetor via output hose 20 or, in accordance with one aspect of the present invention, it is directed to subsystem 16 by a suitable hose 22. Each of these hoses may be an appropriately sized nylon reinforced neoprene hose. Subsystem 16 provides an electrical heating coil or other suitable means, as will be seen hereinafter, for vaporizing the gasoline it receives from subsystem 14. This vaporized fuel is then applied directly to the intake manifold of the engine, bypassing the carburetor altogether, where it is combusted in the usual manner.

In accordance with another aspect of the present invention, the amount of gasoline fuel directed to the engine is automatically varied to provide only the necessary amount to run it at the particular power it develops. This is accomplished by utilizing the vacuum developed at the intake manifold. More specifically, the amount of gasoline fed to the engine is made to increase proportionately with a decrease in vacuum level at the manifold and it is made to decrease proportionately with an increase in vacuum level, i.e., the amount of gasoline fed to the engine is inversely proportionate to the vacuum level at the intake manifold. Moreover, as stated previously, the vacuum level at the manifold is inversely proportional to the power developed by the engine. Therefore, the amount of gasoline fuel directed to the engine is directly proportional to the power it developes to meet a certain RPM demand which, in turn, depends upon the throttle position of the engine.

Based on the foregoing, if the throttle is maintained in an idle position, system 10 will provide the exact amount gasoline fuel required by the engine to develop sufficient power for running at the particular RPM rating for the idle position. At for example half throttle (half power), system 10 will provide the necessary amount of gasoline fuel for running the engine to meet this requirement. In this last example, it should be noted that until the vehicle driven by the engine gets up to speed (as determined by the throttle position) the engine will be required to develop more power than is necessary once the vehicle reaches the desired speed. Hence, until then, more fuel will automatically be fed to the engine and will automatically taper off as the power developed within the engine tapers, without changing the throttle position. Thereafter, should the vehicle start a course up hill, more power will automatically develop within the engine which, in turn, will cause a decrease in vacuum level at the manifold. Thus, an increased amount of fuel will automatically be directed to the engine. In a similar manner, a down hill course will cause less fuel to be directed to the engine.

Having described system 10 generally, attention is now directed to FIG. 2 which illustrates the system in more detail. As seen in this figure, engine 12 is shown along with a carburetor 24, its intake manifold indicated at 26, a fuel pump supply tank, indicated generally at 28, its ignition system indicated generally at 29 and a power supply 27, for example a 12 volt automobile battery. While the engine's throttle as well as other conventional components associated with the overall engine system have not been illustrated they would of course be included where necessary to the overall operation of the engine.

As illustrated in FIG. 2, system 10 includes what may be referred to as a liquid fuel metering arrangement 30 adapted to receive liquid gasoline from the fuel pump and supply tank 28. At the output of fuel metering arrangement 30, system 10 includes a FIRST MODE fuel control valve 32 which is adapted to open and close a line which directs fuel, again in a liquid state between arrangement 30 and a fuel vaporizing arrangement 34. This latter arrangement, as will be seen, vaporizes the liquid fuel received at its input and directs this vaporized fuel to the intake manifold 24 of engine 12.

The various other components which are illustrated in FIG. 2 and which comprise part of system 10 include a SECOND MODE fuel control valve 36, a mode switch 38, a relay 40 and its associated relay contacts 40A and 40B, and a thermostat or other suitable override switch 42 responding to temperature. In addition, system 10 includes an appropriately sized fuse 44 which is in circuit with the FIRST MODE fuel control valve and also with an electrical heating coil comprising part of the fuel vaporizing arrangement 34, as will be seen hereinafter.

System 10 in its preferred embodiment has been designed to operate in two modes. In its FIRST MODE, (position 1 on the switch) the system operates in accordance with the present invention for feeding an automatically varied amount of vaporized fuel to the intake manifold 26 of engine 12. In its SECOND MODE, (position 2 on the switch) system 10 feeds liquid fuel directly to carburetor 24. There is actually a THIRD MODE, (position 3) that is a neutral mode, where neither of these two situations occur, that is, when the engine is not operating.

In order to operate in the FIRST MODE, that is the mode utilizing vaporized gasoline fuel, the mode switch 38 is appropriately positioned to the FIRST MODE (position 1) which closes an appropriate circuit to battery 27 for energizing an indicator light M1. At this point in the operation of system 10, the relay 40 is in a deenergized state and its associated relay contacts 40A and 40B are in their opened positions, as indicated. Accordingly the FIRST MODE fuel control valve is closed (deenergized) and the fuel vaporizing arrangement is inoperative, that is, its electrical heating coil is not energized.

In order to make system 10 operative in its first mode, the throttle position is selected by the operator, which is usually the idle position during initial startup and the ignition system 29 is turned on. At this time, power is delivered from battery 27 through mode switch 28 to relay 40 for energizing the latter. Energization of relay 40 causes relay contacts 40A and 40B to close which in turn respectively cause the FIRST MODE fuel control valve to energize and close and the heating coil in fuel vaporizing arrangement 34 to heat up. At the same time, it should be noted that the SECOND MODE fuel control valve 36 is in a deenergized, closed state, thus closing the fuel line between the fuel pump and supply tank and the carburetor.

Having opened control valve 32, liquid gasoline passes into the fuel metering arrangement 30, actually into a chamber comprising part of the arrangement, as will be seen hereinafter, from the fuel pump and supply tank 28. Arrangement 30 meters the fuel it receives in a controlled fashion to be described below through the FIRST MODE fuel control valve and into the fuel vaporizing arrangement, again actually into a chamber comprising part of the arrangement. The liquid fuel received at arrangement 34 is vaporized by means of the previously referred to heating coil and fed, again in a controlled fashion, into intake manifold 26 where it is eventually burned by engine 12.

In a preferred embodiment of the present invention, the amount of liquid fuel fed to fuel vaporizing arrangement 34 automatically varies proportionately with the power developed by the engine. In a similar manner, the vaporized fuel fed to the intake manifold from the fuel vapor arrangement 34 automatically varies proportionately with the power developed by the engine. This is accomplished, as will be seen with respect to FIG. 3, by making both arrangements 30 and 34 responsive to the vacuum level within intake manifold 26, as indicated by the feedback arrows 46 and 48. It should suffice now merely to state that as the power developed in engine 12 increases, the vacuum within intake manifold 24 decreases causing both arrangements 30 and 34 to deliver, simultaneously and in synchronism, more fuel to the engine and as the engine develops less power, the vacuum within the intake manifold increases causes arrangements 30 and 34 to deliver, simultaneously and in synchronism, less fuel to the engine.

When operating in the first mode, it is desirable to utilize the heat from engine 12 for vaporizing the liquid gas, of course where there is sufficient heat at the engine, rather than using unnecessary power from battery 27. To accomplish this, thermostat 42 is positioned in line with the power supply, that is, the battery and the heating coil to be described. This device 42 is located in close proximity to the heating coil so that when the temperature at the coil, resulting from the engine's heat, is sufficiently high to vaporize the incoming liquid gasoline without the need for electrical power, the device opens the circuit between battery 27 and arrangement 34.

In order to operate system 10 in its second mode of operation for feeding liquid gasoline from the fuel pump and supply tank directly into the carburetor in liquid form, the mode switch is first moved to its SECOND MODE position. With the switch repositioned, an appropriate circuit to the battery closes for energizing a second indicator light M2. Of course the circuit including indicator light M1 is opened for deenergizing the latter. Now, with the engine not running and the ignition system off, both the FIRST MODE fuel control valve and the SECOND MODE fuel control valve are deenergized and hence prevent passage of gasoline. Once the ignition system is turned on, the circuit between battery 27 and the SECOND MODE fuel control valve 36 closes through mode switch 38, thereby energizing this valve and opening up its associated line for feeding liquid gasoline fuel directly into the carburetor from the fuel pump and the supply tank. This, of course, means that the gasoline bypasses fuel metering station 30, FIRST MODE fuel control valve 32 and fuel vaporizing arrangement 34. As will be best illustrated in FIG. 3, the SECOND MODE fuel control valve not only allows the passage of liquid gasoline from the fuel pump and supply tank directly into the carburetor, but in its preferred form it also prevents passage of liquid gasoline to the fuel metering arrangement.

As described above, system 10 can operate in two effective modes, one in accordance with the present invention, i.e., the FIRST MODE described above, and also in a conventional mode, i.e., whereby liquid gasoline is fed directly into the engine via the carburetor, the SECOND MODE described above. In this regard, the preferred embodiment of the present invention has been designed for incorporation into an existing internal combustion engine. However, it is to be understood that the system could be designed for use in a new engine which does not include a carburetor and/or conventional gasoline feed apparatus. In other words, system 10 could be designed without the SECOND MODE of operation.

Having described system 10 and its method of operation, attention is now directed to FIGS. 3, 4, and 5 for a more detailed description of the various components making up this system. As illustrated in FIG. 3, system 10 includes a housing or casing 50 for containing most of the components making up system 10, with the exception of fuel vaporizing arrangement 34 and associated thermostat 42. Actually, it should become apparent that the various components contained within the housing or casing 50 together make up the previously described subsystem 14 while the fuel vaporizing arrangement 34 and its associated thermostat together make up the previously described subsystem 16.

Turning to FIG. 4 in conjunction with FIG. 3, attention is specifically directed to fuel metering arrangement 30. As illustrated, this arrangement includes a liquid gasoline metering valve 52 comprised of a housing 54 which is mounted to and within casing 50 by suitable means, for example a bracket 69 and which defines a metering chamber 56. This chamber includes a top section 58 and a bottom section 60 separated by means of an internal stationary jet 62. This stationary jet is actually a conventional valve seat which circumscribes the inner wall of the chamber for defining a fixed passage 64 between the top and bottom sections of chamber 56. As will be seen hereinafter, liquid gasoline enters into the top section of chamber 56 through an appropriately sized inlet 66 and is metered through passage 64 into bottom section 60 of the chamber in a controlled fashion to be described, and finally the liquid gasoline passes out of the valve through an appropriately sized outlet 68.

In order to control the amount of liquid gasoline metered through valve 52, arrangement 30 includes a valve control assembly 70 which is illustrated in both FIGS. 3 and 4. This assembly includes a vacuum responsive piston 72 and cooperating cylinder 74. As illustrated in FIG. 3, the cylinder is mounted in a fixed position within and against casing 50 by any suitable means, for example previously mentioned bracket 69 which supports housing 52. As will be described in detail below, piston 72, which is located above the cylinder, is adapted for movement to a limited degree towards and away from the cylinder, as indicated by the two-way arrow 76. In the embodiment illustrated, the piston is biased in its extended position, that is, a position away from cylinder 74 by suitable biasing means, for example a spring 78 located within the cylinder. Suitable means (not shown) may be provided for varying the amount of biasing force exerted by this spring. Movement of the piston towards cylinder 74 to overcome the biasing force exerted by sprint 78 is achieved by means of vacuum. More specifically, cylinder 74 is connected to a source of vacuum, specifically to previously discussed intake manifold 24, so that the closeness of piston 72 to cylinder 74 is directly proportionate to the vacuum level at the manifold, that is, the higher the vacuum level, the closer the piston is to the cylinder.

For reason to be discussed hereinafter, the movement of piston 72 both towards and away from cylinder 74 is limited to a predetermined extent. This is accomplished utilizing a pair of vertically extending, spaced apart screws 80 and 82. As illustrated in FIG. 3, each screw 80 and 82 is thread mounted at one end through a cooperating thread opening in a support bracket 84 (or held in place by counternuts as shown) and held in an adjustably fixed vertical position. The support bracket is riveted or otherwise suitably connected to casing 50. It should be noted that screw 82 extends through what may be referred to as a stop plate 86 which is fixedly connected to the top of piston 72 for movement therewith. Also note that the head of screw 82 is located above the head of screw 80 and also above stop plate 86. Further, note that the opening in stop plate 86 through which the shank of screw 82 extends is sufficiently large to allow movement of the stop plate along the shank of the screw but is sufficiently small to prevent movement passed the head of the screw. Hence, it should be readily apparent that stop plate 86 limits the movement of piston 72 to the vertical distance between the heads of the screws 80 and 82. The head of screw 80 prevents further downward movement of stop plate 86 and therefore the piston and the head of screw 82 prevents further upward movement of these components. as will be seen below, the positions of these screws determines the minimum and maximum amount of liquid fuel passing through valve 52.

Having described valve 52 and valve control assembly 70, at least in part, attention is now directed to the particular way in which this control assembly actually controls the amount of liquid gasoline metered throug the valve. Piston 72 carries with it a suitably connected bracket or other such means 88 and associated support screw 90 which together fixedly support a vertically downwardly extending metering rod (needle) 92 which is movable with the piston. As illustrated in FIG. 4, a bottom end section of this rod or needle extends into chamber 56 and is vertically movable therein with movement of piston 72. In this regard, an appropriate seal 94 is provided around the opening through which rod 92 passes for providing a seal at this entry point. As also illustrated, a bottom section of the rod or needle tapers inwardly towards its bottom and is located in valve seat 62 as illustrated. As the rod tends to move further towards the bottom section of chamber 56, the metering jet, that is, the opening through the valve seat becomes smaller, allowing less fuel to pass between the two compartments and as the rod moves up and further from the bottom section of the chamber, the jet enlarges allowing more liquid fuel to pass therebetween. It should be apparent that valve 52 is similar, if not identical, in operation to a conventional needle valve. In this regard, any suitable means which achieves the same end as valve 52 may be provided.

In the actual practice of the present invention, cylinder 74 is connected to the intake manifold 26 of engine 12 through a vacuum line connector 100, a suitably sized vacuum hose 102, and a suitably sized vacuum hose 104. As illustrated in FIG. 3, vacuum hose 102 and 104 are connected together by a tee connection 106. The other end of hose 104 (not shown) leads to the intake manifold. Accordingly, as the vacuum level at the intake manifold varies with the power developed by the engine in the manner described previously, the position of piston 72 will vary and hence so will the position of rod 92 with respect to jet 62. More specifically, as the vacuum level increases (lower power), the piston moves closer to the cylinder for reducing the amount of fuel passing through valve 52. As the vacuum level decreases (more power), the piston moves further from the cylinder for increasing the amount of fuel passing through the valve.

Of course, the necessary calibration would have to be made to correlate the amount of gasoline passing through the valve with the vacuum level at the manifold. This could be readily provided by those with ordinary skill in the art. In this regard, the adjusting screw 80 is positioned such that when the engine is idling (maximum vacuum level) the rod or needle is in its downward most position (the stop plate rests against the top of screw 80) to allow a predetermined, minimum but sufficient amount of fuel to pass through chamber 56. Screw 82 is positioned such that when the engine develops full power so that there is a minimum, if any, vacuum at the manifold, the rod 92 is in its upward most position (the stop plate rests against the underside of the head of screw 82) for allowing the desired maximum flow of liquid fuel through the chamber.

As stated previously, the liquid gasoline is directed to arrangement 30 from fuel pump and supply tank 28 and is directed on to and through the first mode fuel control valve 32. This is accomplished by utilizing a number of interconnected fuel hoses generally indicated at 110 for connecting the fuel pump to inlet 66 in valve 52 of arrangement 30 and a hose 112 for connecting the outlet 66 of this valve to the inlet of FIRST MODE fuel control valve 32.

As illustrated in FIG. 3, valve 32 is a conventional solenoid operated fuel control valve which when deenergized is closed and when energized is open. This solenoid valve, as illustrated, is electrically connected through previously described normally closed contact 40A of electromagnetic relay 40 and fuse 44 to a suitable source of power, for example battery 27. While the various electrical lead wires for making these connections have been illustrated, at least in part, references thereto will not be made. It should be quite obvious to those with ordinary skill in the art exactly how the various components are electrically connected to one another to operate in the manner described.

As just stated, the input to solenoid valve 34 is connected to the output of arrangement 30 by means of hose 112. The output of solenoid valve 34, as illustrated in FIG. 3, is connected to one end of previously mentioned hose 22, by means of a hose connection 114 and suitable clamps (not shown). The other end of hose 22 is connected to the input of fuel vaporizing arrangement 34.

Turning to the details of arrangement 34, attention is directed to FIG. 5 in conjunction with FIG. 3. As illustrated in these figures, fuel vaporizing arrangement 34 includes a longitudinally extending housing 120 which is fixedly mounted in place by suitable means not shown), which defines an internal chamber 123 and which includes a vent 124 extending in an outwardly tapered fashion from one end of the housing towards but stopping short of its opposite end. A 12 volt heating coil 125 is located within housing 120, near the end of the housing opposite vent 124 and is appropriately energized through relay contact 40B and fuse 44 by means of battery 27, as stated previously. Again, the appropriate electrical leads to accomplish this while shown in part will not be discussed. A longitudinally extending slide cover 126 (approximately one-half the length of housing 120) is concentrically located over a longitudinal segment of housing 120 and is slidably movable along the housing, as indicated by the two way arrow 128. As will be seen below, this slide cover is provided for varying the size of vent 124 for varying the amount of vaporized gasoline passing through the vent.

Arrangement 24 also includes a vacuum responsive piston 130 and associated cylinder 132 identical, at least in operation, to previously described piston 72 and associated cylinder 74. As illustrated in FIG. 5, the cylinder is fixedly mounted in place to housing 120 by suitable means, for example bracket 134 and is operatively connected to the intake manifold through tee connection 106 and vacuum hose 104. The piston 130 on the other is free to move between an extended position closer to the cylinder. The piston is biased in its extended position, that is, away from the cylinder by any suitable means such as return spring 138 located within cylinder 132. The amount of the movement of the piston towards the cylinder overcoming the forces supplied by spring 138 is calibrated to be directly proportional to the level of vacuum within the intake manifold of the engine, that is, the greater the vacuum level the closer the piston 130 is to cylinder 132 and the further it is from its biased position (minimum vacuum).

As seen in FIG. 5, a tie rod or other such means 140 is provided for interlocking slide cover 126 for movement with piston 130. In this manner, as the piston moves towards its extended or biased position (minimum vacuum, maximum power), the slide cover moves away from vent 124 so that the vent can be opened to the fullest extent desired (maximum level). On the other hand, as the piston moves towards its associated cylinder, under the influence of vacuum developed in the intake manifold, the slide cover 126 moves towards the end of housing 120 containing vent 124 for progressively reducing the size of the vent in proportion to the level of vacuum developed within the intake manifold. The position of slide cover 126 relative to vent 124 can be adjusted by any suitable means, for example an adjustment screw 142 used to adjust the position of tie rod 140. In an actual working embodiment, the slide cover would be adjusted so as to allow a minimum amount of fuel to pass out vent 124 when the vacuum level within the engine is at a maximum (the idle position) and the slide cover would be positioned to allow maximum flow of fuel through the vent when the vacuum level is at a minimum (full power). In any event, the appropriate amount of vaporized gasoline in the chamber 123 of housing 120 is drawn through vent 124 and into the intake manifold by engine 12.

As stated previously, arrangement 34 includes heat coil 125. This heating coil is of course provided for vaporizing the liquid gasoline as it passes into housing 120. As illustrated in FIG. 3, subsystem 16 may include previously referred to thermostat 42. This thermostat is connected in line with the heater and power supply and would be physically located adjacent housing 120, so as to deenergize the heating coil 125 in the event the temperature at the housing developed by engine 12 is sufficiently high in by itself to vaporize the liquid gasoline as it enters the housing. The exact amount of heat required to vaporize the gasoline and the setting of thermostat 42 could be readily determined by those with ordinary skill in the art. Once chamber 123 is heated to the required temperature, whether by the heater or the engine's heat, the liquid gasoline passing therethrough will vaporize. In this regard, it should be noted that combustion within chamber 123 will not take place so long as there is insufficient oxygen within the chamber or the fuel passes through it too fast. During idle condition even though the gasoline does not pass through chamber 123 rapidly, the effective opening of vent 124 is quite small and hence prevents sufficient oxygen to support combustion. Where the vent opening is larger (higher fuel consumption), the gasoline passes through the chamber too fast to support combustion therein.

Having described fuel vaporizing arrangement 34, the only remaining component of the system 10 to discuss in detail is the SECOND MODE fuel control valve 36. As illustrated in FIG. 3, this valve is solenoid operated and is connected in circuit through switch 38 to battery 27 when the switch is in its SECOND MODE position. The input of the valve is connected in line with the series of hoses 110 and its output is connected directly to the carburetor through a hose 160 which in turn is connected to previously referred to hose 20. When switch 38 is in a position other than its SECOND MODE, the solenoid actuated valve remains deenergized for closing the path of fuel between the fuel pump and carburetor (hose 110 remains open through this valve). Upon placing the switch in SECOND MODE, the solenoid energized opening up the line between the fuel pump and carburetor. It should be pointed out that since the switch is in this second position, the previously described control valve 32 remains closed. Accordingly, system 10 in this second mode of operation allows the engine 12 to be fed gasoline fuel in the conventional manner, bypassing both the fuel metering station and the fuel vaporizing station. In this regard, it should be noted that a conventional valve 36 can be provided that will open the line from the fuel pump to the carburetor and at the same time automatically close the line 110 from the fuel pump to fuel metering arrangement 30.

As noted above, a detailed description has been provided for the fuel metering arrangement 30, FIRST MODE fuel control valve 32, fuel vaporizing arrangement 24 and SECOND MODE fuel control valve 36. It is believed that a detailed discussion of the other components making up system 10 is unnecessary. It should suffice to state that the relay 40 and its associated contacts, the mode switch 38 and the fuse 24 are all conventional components suitably mounted within or to casing 50 and appropriate interconnection with one another and with the components described in detail to function in the manner described.

Turning now to the overall operation of system 10, let it first be assumed that the engine is not running, the ignition system is off and the selector switch 38 is placed in the FIRST MODE of operation. In this particular situation, the indicating light M1 is energized and with the engine not running the vacuum level at the intake manifold is at its lowest level, specifically actually no vacuum at all. Hence, the valve 52 comprising part of the fuel metering arrangement 30 is in its fully opened position as is the vent 124 comprising part of arrangement 34. However, fuel does not flow through these arrangements because solenoid actuated valve 32 deenergized and hence closed.

Let it now be assumed that the engine is to be started and run in its idle position (lowest throttle level). Once the ignition system is turned on, this energized relay 40 for closing both contacts 40A and 40B. Closure of contact 40A causes the FIRST MODE fuel control valve to energize for opening the line between hoses 112 and 22. At the same time, the closure of contact 40B causes the coil 125 to heat up. As the engine idles, it develops a maximum vacuum at the intake manifold, for example 21 inches of mercury. In response to this high vacuum level, the liquid fuel control valve 52 closes to the maximum amount adjusted for by screw 80 to allow the minimum amount of liquid fuel therethrough. At the same time and in synchronism therewith, the sleeve 126 moves to its extreme position over vent 124 for providing only the minimum amount of vaporized gasoline therethrough. This gasoline is of course directed actually drawn into the engine for maintaining the engine in its idle position.

Assume now that the operator desired to run the engine above its idle position. Movement of the throttle to a second position, for example a half throttle or full throttle position, causes the engine to develop more power which in turn reduces proportionately the vacuum within the manifold. This in turn causes the valve 52 to open and vent 124 to open proportionately and in synchronism with one another, thereby allowing more gasoline, both in its liquid state and ultimately in its vaporized state to pass through the system into the engine. Once the engine reaches the rated speed as determined by the throttle position, less power is necessary to maintain the rated speed and hence the power developed will drop to a lower level causing the vacuum level at its intake manifold to drop, thus automatically reducing the amount of fuel fed through system 10. This is carried out automatically regardless of the fact that the throttle is left in its original position. This is because both arrangements 30 and 34 respond to the level of vacuum in the engine and not merely to the throttle position itself.

The manner in which system 10 operates in its SECOND MODE should be self-explanatory. With the switch in its SECOND MODE position, the valve 36 is energized while the relay coil 40 and valve 32 are deenergized. This means that gasoline in its liquid state goes directly from the fuel pump back into the carburetor bypassing both arrangements 30 and 34.

Having described fuel feed system 10 including its various components illustrated in FIGS. 1 to 5 and its manner of operation, attention is now directed to FIG. 6 which illustrates a modified system 200. This modified system, which is constructed in accordance with the present invention, is also provided for feeding gasoline fuel into a gasoline burning internal combustion engine, specifically engine 202 which, in and by itself, may be identical to previously described engine 12. As will be seen hereinafter, one major difference between system 10 and system 200 is that the latter system utilizes a vaporization assembly for converting liquid gasoline fuel to vaporized fuel without the utilization of directly applied heat, whereas previously described fuel vaporizing arrangement 34 does use heat, as discussed. Other differences between these two systems will become apparent from the detailed description of the system 200 to follow.

Turning specifically to FIG. 6 in conjunction with FIG. 7, it can be seen that system 200 includes an assembly 204 for converting liquid gasoline to vaporized fuel ultimately for use in engine 202. As will be discussed hereinafter, the purpose of this assembly is to saturate a stream of air with sufficient gas vapor fumes to operate the engine. Accordingly, assembly 204 includes one inlet 206 for providing air into the assembly from the ambient surroundings and a second inlet 208, actually an inlet arrangement, for directing liquid gasoline, as previously defined, into the assembly, at the same time.

As seen only in FIG. 6, the air to be directed into assembly 204 is first passed through a conventional air filter 210 for conventional filtering purposes and thereafter through a valve 212 before entering the vaporization assembly. This valve may be of any suitable, conventional back flow preventing type and is provided for preventing the air once inside the assembly or for that matter any other gaseous fumes inside the assembly from escaping into the ambient surroundings through inlet 206. In other words, the valve is of the one-way type allowing air to flow into the assembly in the direction of the arrows while preventing any back-flow in the opposite directions. In this regard, while any suitable means such as a separate pressure or vacuum pump may be provided for drawing the air into assembly 204, the preferred way in which this is accomplished is by utilizing the vacuum developed by the manifold (not shown) within engine 202, as will be discussed hereinafter.

As the air is being drawn into assembly 204 liquid gasoline is directed into the assembly through inlet arrangement 208, as stated above. This gasoline fuel may be obtained from any suitable source but where the system is utilized as part of vehicle, as previously stated with respect to system 10, the gasoline fuel is derived from the vehicle's supply tank through its fuel pump. A conventional fuel regulator 214, for example a conventional float assembly, is provided for regulating the amount of liquid gasoline to be supplied through the fuel inlet arrangement 208 and ultimately into assembly 204.

As stated above, assembly 204 is provided for saturating the input air with sufficient gasoline vapor fumes to operate the engine. As will be seen below, this is accomplished by vaporizing the liquid gasoline directed into the assembly and entraining this vaporized gasoline in a stream of air which passes out of the assembly through an outlet 216. As indicated in FIG. 6, this vapor saturated air passes through a second valve 218, specifically a second back flow preventer which may be identical to previously recited valve 218 for eliminating the possibility of back-flow from engine 208 into assembly 204. Moreover, the value may include a screen, for example a 100 mesh/in² brass screen (not shown), for preventing conbustion within the engine from backfiring into assembly 204.

After the vapor saturated air passes through valve 218, it enters into a fuel mix station indicated generally at 220. This station takes the form of a chamber in which the vapor saturated air is mixed with a secondary supply of air to provide a predetermined mixture of air and vapor fumes for combustion in engine 202. This secondary supply of air is controlled by means of an automatic choke arrangement 222 or other conventional valve control means which automatically closes when the engine is cold to provide a richer mix of fuel vapor, i.e., the vapor saturated air without the secondary air. This is accomplished by monitoring the temperature of the water in the engine as is typically done by means of an automatic choke. Once the engine warms up to a predetermined temperature, as indicated by the temperature of the engine water, it remains open to provide a predetermined mix of vapor saturated air from assembly 204 and secondary air. This predetermined mix, whether it be the richer mix when the engine is cold or the more diluted mix when the engine is warm, is drawn into the engine by means of the vacuum developed in the engine's manifold, through the engine's carburetor indicated at 224 and through the carburetor's conventionally provided air cleaner (not shown). While the vaporized fuel mix actually passes through the carburetor, it does so only as a means to reach the engine in the same way as previously described system 10 and does not actually use the carburetor in the conventional manner. However, it is to be understood that system 200, like previously described system 10, can include a bypass loop (not shown) for feeding fuel into engine 202 in the conventional manner utilizing carburetor 224 in its conventionally intended manner. In this regard, it is to be understood, that conventional controls (not shown) would be provided to operate system 200 in both modes, i.e., in one mode utilizing assembly 204 and associated components and in a second mode by passing the assembly.

Having described system 200, attention is now specifically directed to assembly 204. As illustrated in FIG. 7, this assembly includes a housing 226 which defines an internal chamber 228 (see FIG. 8) and which includes previously recited air inlet 206, fuel inlet arrangement 208 and outlet 216. As also seen in FIG. 7, an additional conventional fuel pump indicated at 230 may be provided for pumping the liquid gasoline into arrangement 208. Moreover, housing 226 may be warmed by suitable means, for example copper tubing 232 which is helically wound around the housing. This copper tubing, while not shown, is connected into the hot water circulation line of the engine so that the water circulating through the engine is utilized to warm the vaporization assembly.

As illustrated in FIG. 8, assembly 204 includes a first plurality of gasoline support plates 234a, 234b and 234c which are fixedly located within chamber 228 in a spaced-apart, longitudinally aligned array starting with plate 234a and followed by plate 234b and finally plate 234c. Each of these plates has a front side, the right hand side as viewed in FIG. 8, and a back side, the left hand side as viewed in FIG. 8, and displays a predetermined porosity to the flow of air from its front side to its back side, as will be discussed hereinafter. As will also be discussed, in a preferred embodiment the porosity of these plates to the passage of air therethrough successively increases starting with plate 234a.

As also illustrated in FIG. 8, assembly 204 includes a second plurality of gasoline support plates 236a, 236b, and 236c located within chamber 228 in a spaced-apart, longitudinally aligned second array located adjacent to and longitudinally aligned with the first plates. Each of these second plates 236a, 236b and 236c includes a similar front side and back side and, like the first mentioned plates, displays a predetermined porosity to air passing from its front side to its back side. However, as will be discussed hereinafter, the porosity in each of the second plates is preferably the same.

Turning specifically to FIG. 10, plate 234a is illustrated. This plate, in a preferred embodiment, is a composite made up of a layer of metal screening 35 and a layer 37 of glass fiber cloth bonded to one face of the screening. In a preferred embodiment, the glass cloth is about $\frac{1}{8}$ inch thick. It defines $\frac{1}{8}$ in$^2$ mesh openings and the screen defines $\frac{1}{4}$ in$^2$ openings. Plate 234b is identical to plate 234a in the preferred embodiment except that the cloth defines $\frac{1}{4}$ in$^2$ mesh openings. Likewise, the plate 234c is identical except that its cloth defines $\frac{3}{8}$ in$^2$ mesh openings. The three plates 236a–236c each defines $\frac{1}{4}$ in 2 mesh openings in its cloth, as in plate 234b, in the preferred embodiment.

Assembly 204 includes a plurality of baffle plates 238a through f, one for each of the gasoline support plates. As illustrated in FIG. 8, a baffle plate is positioned in front of and associated with each of the gasoline support plates. For example, baffle plate 238a is positioned in front of gasoline support plate 234a, baffle plate 234b is positioned in front of gasoline support plate 234b and so on. As will be seeen hereinafter, these baffle plates provide means for directing a stream of air which enters chamber 228 through air inlet 206 successively through the various support plates starting with support plate 234a. In a preferred embodiment, these baffle plates together direct the air stream alternately towards one edge of a given one of the plates, for example the lower edge of plate 234a, and towards an opposite edge section of a next, adjacent plate, for example the top edge of support plate 234b and so on, as the stream passes through the successive plates. In this regard, reference plates in vertical plan view, for example plate 234b. As illustrated in this figure, the plate includes a pair of slotted openings 240 which extend horizontally across the plate along its top edge. These slotted openings provide for directing the flow of air from plate 234a towards 234b in the direction of the top edge portion of the latter. Baffle plates 238d and 238f, as illustrated in FIG. 8, would be identical to baffle plate 234b as illustrated in FIG. 11. On the other hand, baffle plates 234a, 234c and 234d would include slotted openings across the bottom edge portion, as indicated by the phantom slots in FIG. 11. In all other respects, the various baffle plates could be indentical and could be constructed of any suitable nonporous material such as plastic or metal.

The various gasoline support plates and baffle plates may be fixedly held in place within chamber 228 of housing 226 by any suitable means. As seen in FIG. 8, this is accomplished by utilizing two strips of rigid, corrugated material, for example corrugated sheet metal, a top strip 242 and a bottom strip 244. The top strip is fastened by a suitable means (not shown) to housing 226 along the length of chamber 228 and the bottom strip is fastened by suitable means (not shown) to the housing along the bottom edge of the chamber. For reasons to become apparent hereinafter, the two strips of corrugated material are aligned relative to one another so that the plates and particularly the gasoline support plates are at a slight angle from the vertical, for example about 2°, when supported by these strips. In this regard, it should be noted that it is not necessary to bond or otherwise secure the various plates in place but rather requires only positioning them within in the appropriately aligned corrugations for support therein. In this regard, housing 26 would of course include suitable access into chamber 28 for positioning the plates therein.

As stated previously, the purpose of assembly 204 is to saturate the stream of air passing therethrough with sufficient gas vapor fumes to operate engine 202. In order to accomplish this, the assembly includes an arrangement 246a, 246b, 246c respectively associated with each of the first group of gasoline support plates, specifically plates 234a, 234b and 234c for applying predetermined amounts of liquid gasoline onto its associated plate for vaporization thereon. As will be seen below, in preferred embodiment, the amount of liquid gasoline which is applied to these gasoline support plates successively decreases starting with the first plate, that is, with plate 234a. Moreover, in this preferred embodiment, the liquid gasoline is directed onto its associated support plate at two or more distinct locations.

As best illustrated in FIG. 8, arrangement 246a includes one section of previously recited gasoline inlet arrangement 208, specifically the two inlet tubes 248a extending from the main line 250 all of which comprise part of the inlet arrangement as seen in FIG. 7. Arrangement 246a also includes one V-shaped section 252a of previously recited corrugated support 242. This section which is best shown in FIG. 9 is located directly under inlet tubes 248a and includes a plurality of longitudinally spaced openings or apertures 254a located across its bottom edge 256a. In operation, the liquid gasoline fuel drips into section 252a which acts as a trough and thereafter through the various apertures 254a and finally on to the back surface of support plate 234a which is located in a position to receive the gasoline drops. In this regard, it should be apparent that plate 234a is preferably slightly inclined, as previously stated, to insure that the drops of gasoline from trough 252 will in fact fall onto the support plate. As also stated previously, the liquid gasoline is preferably applied to the support plate at two or more distinct locations. The reason for this is to insure the liquid gasoline fills both ends of trough 252a so as to pass out of all of the apertures 254a, even if the vehicle is positioned on an uphill grade or a donwhill grade causing the trough to be so inclined. In the embodiment illustrated, two separate locations near each end of the trough are utilized.

Having described arrangement 246a, it does not appear necessary to describe arrangements 246b and 246c in detail. It should suffice to say that arrangement 246b includes two inlet tubes of the gasoline inlets arrangement 208, specifically those tubes designated 248b and an associated section 252b of corrugated support 242. In a similar manner arrangement 246c includes the last two inlet tubes of the inlet arrangement 208, specifically inlet tubes 248c and still another section 252c of the corrugated support. The inlet tubes 248b and their associated corrugated section 252b are positioned relative to plate 234b to function in the same manner as previously described arrangement 246a and the inlet tube 248c and their associated corrugated section 252c are positioned relative to plate 234c to function in the same manner.

In accordance with a preferred embodiment of the present invention, the amount of gasoline which is applied to these places successively decreases starting with the first plate, that is, plate 234a as stated previously. This may be accomplished by progressively decreasing the size of apertures 254a, 254b and 254c associated with their respective troughs. However, in a preferred embodiment, all of the apertures are of the same diameter, specifically 1/16" in a working embodiment. Rather, the number of holes are decreased and hence the spacing between holes is increased, since the holes are all equally spaced, from one corrugated section to the next. In a actual working embodiment, the apertures 254a in section 252a are spaced apart ½", in section 252b the apertures are spaced apart 1" and in section 252c, they are spaced apart 2" from one another.

Having described assembly 204 structurally, attention is now directed to the manner in which it operates to saturate a stream of air with sufficient gas vapor fumes to operate engine 202. As stated previously, a stream of air is drawn through chamber 228 of housing 226, as indicated by the arrows 260. This stream of air is drawn into the chamber through air inlet 206 and is caused to take the torturous path 60 indicated by previously described baffle plate 238a through 238f. In other words, the stream of air is first directed towards the bottom edge of plate of 234a and after it passes therethrough it is directed towards the top edge of plate 234b and so on. The air may be drawn through the chamber and through outlet 216 by any suitable means, for example pump means, but as stated previously, it is preferably accomplished by means of the vacuum produced at the engine's manifold. Hence, the chamber would be vacuum connected ultimately to the manifold, which of course is the case since the vapor saturated air stream is ultimately directed into and through the manifold.

As the air stream 216 passes through the chamber, the previously described arrangement 246a, 246b and 246c respectively apply liquid gasoline onto their associated gasoline support plates 234a, 234b and 234c, for vaporization thereon. In this manner, as the stream of air passes through plate 234a from its front side to its back side, the vaporized gasoline threon is entrained by and carried with the stream of air. This stream passes through the next plate, specifically plate 234b and the vaporized gasoline thereon is also entrained by and and carried with the stream of air. This occurs again with respect to plate 234c. At this point, it is quite possible that the air stream is completely saturated with gasoline vapor and hence could be applied directly from this point into the engine. In fact, it is quite possible, although not probable, that only one or two gasoline bearing plates are necessary to accomplish this and hence only one or two such plates would be required. On the other hand, in order to saturate the air stream to the level desired, preferably to full saturation, it might be necessary to utilize more than three plates and hence more than three of the previously described liquid gasoline directing arrangements. Moreover, it is also possible that a portion of the gasoline entrainted in and carried by the air stream after passing through the last gasoline bearing plate remains in liquid form. To insure that this liquid gasoline is vaporized, assembly 204 includes plates 236a, 236b and 236c. As stated previously, these plates are identical to plates 234a–234c but are preferably all of the same porosity. Moreover, these plates do not receive their own independent supply of liquid gasoline, but rather causes the liquid gasoline already in the stream to vaporize as the stream passes through these latter plates. In this way, the air stream flowing out of the outlet 216 will be saturated to the level desired with gasoline vapor or fumes and will include essentially no liquid gasoline. Obviously, the number of "dry" plates which are necessary to accomplish this may vary from no plates at all to one, two, three plates or more depending upon the amount of liquid gasoline applied to the "wet" plates (plates 234a–234c), the porosity of the various plates, the number of wet plates and the velocity of the air passing therethrough.

From the foregoing, it should be quite apparent that assembly 204 vaporizes gasoline without the utilization of directly applied heat. In the preferred embodiment discussed, six gasoline support plates, three wet plates and three dry plates were utilized. However, as also stated, the number of plates utilized could vary. Moreover, it is to be understood that the particular way in which the gasoline in liquid form is applied to the wet plates could also vary and is not limited to the particular arrangement 246a, 246b and 246c. Further, in certain applications it may only be necessary to apply the liquid gasoline into the associated trough at one point or it may be necessary to direct it into the trough at more than two points. Also, it is to be understood that the particular support plates utilized to cause vaporization of the liquid gas within chamber 228 are not limited to those described so long as they are capable of vaporizing liquid gasoline in a practical way and allow the vapors to be entrained and carried therefrom by means of an air stream.

What is claimed is:

1. In a system for feeding gasoline fuel in a vapor state into a gasoline burning internal combustion engine, an assembly for converting liquid gasoline to said vapor state, comprising:
   (a) a housing defining an internal chamber and including:
   (i) Air inlet means,
   (ii) liquid gasoline inlet means, and
   (iii) fuel outlet means;
   (b) a first plurality of gasoline supporting plates fixedly located within said chamber in a spaced-apart, longitudinally aligned array starting with a first one of said first plates, the porosity of said plates to the passage of air therethrough successively increasing starting with said first one;
   (c) a second plurality of gasoline supporting plates fixedly located within said chamber in a spaced-apart, longitudinally aligned second array located adjacent to and longitudinally aligned with said first plates, each of said second plates having a predetermined porosity to the passage of air therethrough;
   (d) means associated with each of said first plates for applying predetermined amounts of liquid gasoline onto its associated first plate for vaporization thereon, the amount of liquid gasoline being applied to said first plates successively decreasing starting with said first one of said first plates, said gasoline applying means associated with each of said first plates including
   (i) a longitudinally extending channeled member opening upwards and having a plurality of longitudinally spaced apertures along its bottom edge, said channeled member being supported within said chamber above said associated gasoline supporting plate, and
   (ii) means for directing liquid gasoline into said channeled member at least at two longitudinally spaced points through said liquid gasoline inlet means, said gasoline passing through said apertures and onto its associated plate,
(e) means for directing a stream of air into said chamber through said air inlet means; and
(f) means for directing said stream of air successively through said first plates during said vaporization, whereby said vaporized gasoline is entrained by and carried with said stream, thereafter successively through said second plates, whereby any liquid gasoline entrained in said stream is captured by said second members for vaporization thereon, and thereafter out of said chamber through said fuel outlet means, said air stream directing means including an air directing baffle plate associated with and located directly in front of each of said gasoline support plate, said baffle plates together directing said air stream alternately towards one edge section of a given one of said plates and towards an opposite edge section of a next, adjacent plate as said stream passes through successive plates.

* * * * *